United States Patent [19]
Hirose et al.

[11] Patent Number: 5,578,181
[45] Date of Patent: Nov. 26, 1996

[54] METHOD FOR TREATING WASTE WATER CONTAINING NEUTRAL SALTS COMPRISING MONOVALENT IONS

[75] Inventors: Yasuo Hirose, Hitachi; Yoshinori Ishii, Yokosuka, both of Japan

[73] Assignees: Hitachi, Ltd.; Japan Nuclear Fuel Co., Ltd., both of Tokyo, Japan

[21] Appl. No.: 470,484

[22] Filed: Jun. 6, 1995

[30]  Foreign Application Priority Data

Jun. 17, 1994  [JP]  Japan .................................. 6-135320

[51] Int. Cl.$^6$ ............................. B01D 61/44; C02F 1/469
[52] U.S. Cl. ........................... 204/523; 204/525; 204/529
[58] Field of Search .............................. 204/182.4, 182.5, 204/523, 525, 529

[56]  References Cited

U.S. PATENT DOCUMENTS

| | | | |
|---|---|---|---|
| 2,860,095 | 11/1958 | Katz et al. | 204/182.4 |
| 3,933,610 | 1/1976 | Ehara et al. | 204/182.4 |
| 3,986,951 | 10/1976 | Fremont | 204/182.5 |

FOREIGN PATENT DOCUMENTS 60-24439  6/1985  Japan .

OTHER PUBLICATIONS

Derek Pletcher and Frank C. Walsh, p. 358, Fig. 7.14, "Industrial Electrochemistry," Second Edition. (no date).

*Primary Examiner*—Arun S. Phasge
*Attorney, Agent, or Firm*—Evenson, McKeown, Edwards & Lenahan, P.L.L.C.

[57]  ABSTRACT

In order to reduce releasing of neutral salts comprising monovalent ions contained in industrial waste effluent to the environment, the waste effluent to be treated is supplied into a prepositive electrodialysis cell comprising ion exchange membranes which transfer monovalent ions selectively for concentrating the salts, concentrated stream is supplied into an electrolytic dialysis cell for separating and recovering acids and bases, subsequently diluted stream is circulated as supplying stream to the prepositive electrodialysis cell, the diluted stream in said prepositive electrodialysis cell is subsequently supplied to and desalted by one or plural electrodialysis cells combined in series, the diluted stream after the desalination is released to the environment, and the concentrated stream is merged to the supplying stream to the prepositive electrodialysis cell. In accordance with the present invention, concentration of impurity in recovered acid decreases to less than $\frac{1}{10}$, and necessary electric power for dialysis treatment and recovery of the acid and the base decreases to less than $\frac{1}{2}$.

20 Claims, 4 Drawing Sheets

METHOD FOR TREATING WASTE WATER CONTAINING NEUTRAL SALTS COMPRISING MONOVALENT IONS

BACKGROUND AND SUMMARY OF THE INVENTION

The present invention relates to a method for treating waste water containing neutral salts comprising monovalent ions, and especially, the method for treating waste water containing neutral salts comprising monovalent ions wherein the monovalent ions contained in industrial waste water are recycled by being separated and recovered as acids and bases which composed the neutral salts, thereby eliminating the neutral salts from the treated waste water released to the environment.

Liquid effluent containing acids, bases, and their neutral salts is often generated from industrial processes using acids, bases, or both. Generally, a method for treating industrial liquid effluent is used wherein a volume of the liquid effluent is reduced by evaporation and the condensed water is discharged. However, currently, membrane separating techniques such as reverse osmosis, ultrafiltration, electrodialysis, and electrolytic dialysis are being developed.

JP-A-60-24439 (1985) discloses a method for treating radioactive liquid waste containing nitrate salts, wherein low level radioactive liquid waste containing nitrate salts is supplied to a central compartment of an electrolytic cell comprising three compartments separated by two separators. One separator is a cation exchange membrane made of fluorocarbonpolymer and the other separator is an anion exchange membrane. The nitrate salts are decomposed by electrolytic dialysis so as to generate nitric acid in an anodic compartment, and alkali hydroxide or ammonium hydroxide in a cathodic compartment, while the radioactive materials are concentrated in the central compartment.

Figure 3:
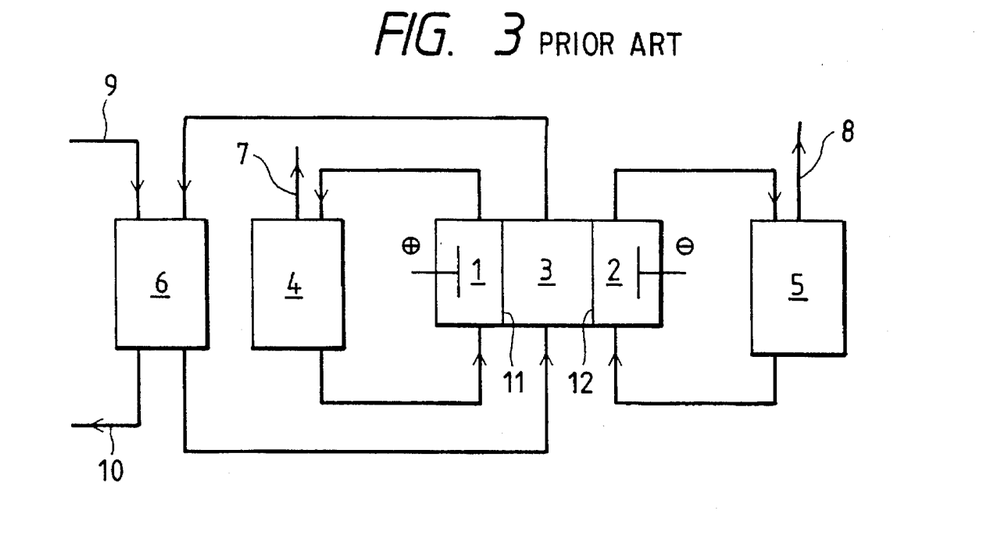
FIG. 3 is a schematic drawing indicating an electrolytic dialysis cell conventional treating apparatus.

FIG. 3 is a flow chart showing the method disclosed in JP-A-60-24439 (1985). Referring to FIG. 3, 1 indicates the anodic compartment, 2 is the cathodic compartment, 3 is the central compartment, 4 is an anolyte tank, 5 is a catholyte tank, 11 is the anion exchange membrane, and 12 is the cation exchange membrane.

In the electrolytic dialysis cell disclosed in JP-A-60-24439 (1985), an ion exchange membrane made of fluorocarbonpolymer is used as the cation exchange membrane 12 dividing the central compartment 3 and the cathodic compartment 2.

The ion exchange membrane has superior durability in alkaline aqueous solution. On the other hand, the anion exchange membrane 11 dividing the central compartment 3 and the anodic compartment 1 is a strongly basic anion exchange membrane or a weakly basic ion exchange membrane. In accordance with electrolytic dialysis, the concentration of nitrate salts in the stream in the central compartment decreases, and the concentration of radioactive elements which are scarcely permeable through the cation exchange membrane such as uranium, plutonium, Am-241, Ce-144, Ru-106, Nb-95, Zr-95, and the like increases.

The method disclosed in JP-A-60-24439 (1985) comprising the steps of decomposing nitrate salts in low level radioactive liquid waste by electrolytic dialysis using ion exchange membranes, concentrating radioactivity in the liquid waste, and treating the concentrated radioactive liquid waste at a processing facility for a medium or high level radioactive liquid waste, is regarded as an industrially usable method which enables recovered nitric acid and hydroxides to be recycled. In accordance with embodiment 1, for example, of the method disclosed in JP-A-60-24439 (1985), sodium nitrate concentration in the untreated liquid waste decreases from 2.4 mole/liter to 2.0 mole/liter in the treated liquid waste. However, the concentration of the salts in the treated liquid waste are preferably decreased more.

Figure 4:
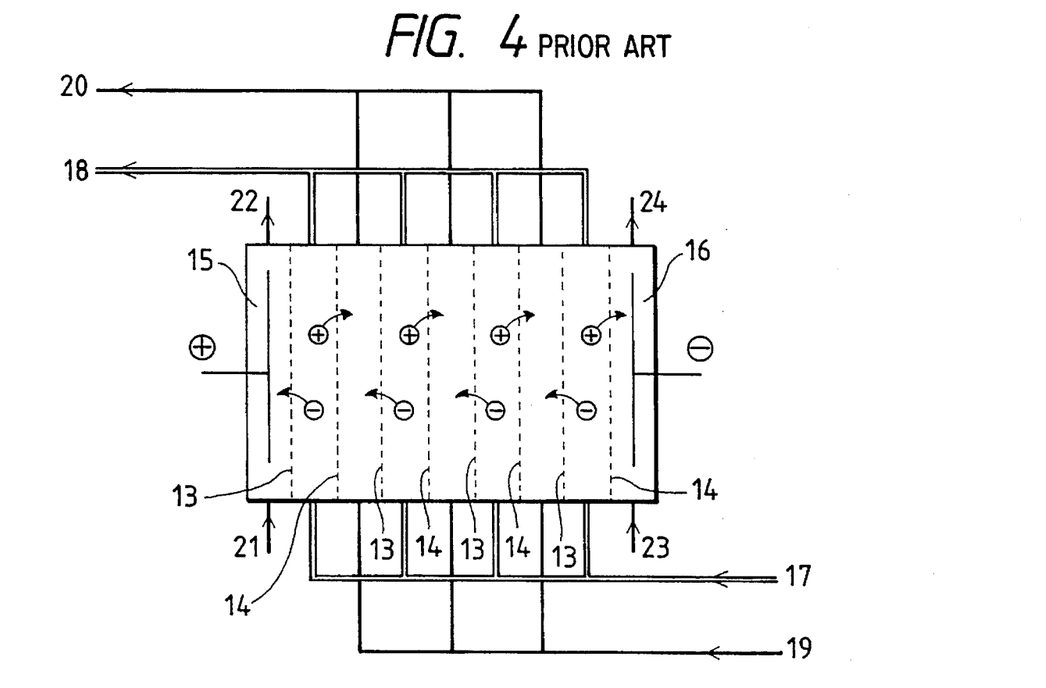
FIG. 4 is a schematic drawing indicating an electrodialysis cell of conventional treating apparatus.

FIG. 4 refers to FIG. 7.14, p. 358 of Derek Pletcher and Frank C. Walsh, Industrial Electrochemistry, 2nd Edition. According to FIG. 4, the electrodialysis cell is an electrolytic cell composed of units comprising a diluted stream compartment and a concentrated stream compartment separated by a cation exchange membrane and an anion exchange membrane. The cell is used to transfer and condense salts from the diluted stream, i.e. the supplied stream, to the concentrated stream, and thereby, desairing the diluted stream. In FIG. 4, 13 indicates the cation exchange membrane, 14 is the anion exchange membrane, 15 is the anodic compartment, 16 is the cathodic compartment, 17 is an entry for the diluted stream, 18 is an exit for the diluted stream, 19 is an entry for the concentrated stream, 20 is an exit for the concentrated stream, 21 is an entry for the anolyte, 22 is an exit for the anolyte, 23 is an entry for the catholyte, and 24 is an exit for the catholyte. The anion in the diluted stream permeates through the anion exchange membrane 14 along with the positive potential gradient and is transferred into the concentrated stream. The cation in the diluted stream permeates through the cation exchange membrane 13 along with the negative potential gradient and is transferred into the concentrated stream. As such, the anion and the cation are neutralized to form a salt. Water is electrolyzed to generate oxygen and the anolyte becomes acidic in the anodic compartment 15, and water is electrolyzed to generate hydrogen and the catholyte becomes basic in the cathodic compartment 16. The above explained electrodialysis cell is used industrially for desalting water containing salt to obtain fresh water, or for recovering salt.

Sometimes, various divalent or higher valent ions exist as impurities in common industrial liquid effluent containing salts of monovalent ions. If the divalent or higher valent ions are cations, the ions permeate the cation exchange membrane 13, and if the ions are anions, the ions permeate the anion exchange membrane 14. Alkali metal ions and ammonium ions are generally stable under the chemical conditions pertinent to liquid effluents, and the above mentioned ions always produce water soluble compounds. However, almost all hydroxides of divalent and higher valent cations are insoluble in water, except for divalent ions such as Mn, Ni, Co, Zn, Cd, Cu, and the like which form complexes that dissolve in an aqueous ammonia solution. Therefore, when the divalent or higher valent cations permeate the cation exchange membrane and enter into the basic catholyte, the cations precipitate and operation of the electrolytic dialysis cell becomes difficult. Even if ammonium hydroxide is used as a base in the catholyte to generate water soluble hydroxides, impurities are contained in the recovered ammonium hydroxide, and cause problems such as the restricted use of the recovered ammonium hydroxide. Some divalent and higher valent cations easily deposit as metals onto the cathode, and make operation of the electrolytic dialysis cell difficult. On the other hand, as for divalent and higher valent anions, anions of elements containing oxygen such as As, Sn, Ge, V, Mo, W, Se, Te, and the like exist. However, carbonic acid, boric acid, and phosphoric acid exit in industrial liquid effluent containing salts of monovalent ions. If the above anions permeate through the anion exchange membrane and enter the anolyte, the anions are contained in the recovered acid of the monovalent ion, and restrict the use of the recovered acid.

Furthermore, when lowering the concentration of neutral salts of monovalent ions in the liquid effluent, using electric current to eliminate parasitic ions, which are not necessarily to be eliminated, lowers the electric current efficiency.

An object of the present invention is to provide a method for eliminating salts in waste water and for recovering acids and bases without impurities, which has not been achieved by the prior art relating to electrolytic dialysis of liquid effluent containing salts of monovalent ions. The issues to be solved are as follows:

1. Lowering the concentration of salts of monovalent ions in waste water.
2. Eliminating impurities other than monovalent ions in the recovered acids and bases.
3. Increasing the concentration of the recovered acids and bases as much as possible.
4. Decreasing the consumption of electric power necessary for processing waste water and recovering the acids and bases.

In order to achieve the above objectives, waste water to be processed is supplied first not directly to an electrolytic dialysis cell, but to a diluted stream compartment in a prepositive electrodialysis cell. A concentrated stream in the prepositive electrodialysis cell containing salts generated by neutralization of ions permeated through a pair of ion exchange membranes is supplied to an electrolytic dialysis cell, which is composed of units. Each of these units comprises three compartments, i.e. an anodic compartment, a central compartment, and a cathodic compartment, which are separated by a cation exchange membrane and an anion exchange membrane respectively, for decomposing the salts to corresponding acids and bases, wherein the acids and bases are recovered.

The diluted stream in the prepositive electrodialysis cell is supplied to a main electrodialysis cell in a subsequent step in order to eliminate residual salts until a final target concentration is achieved.

In order to achieve the above objectives, an ion exchange membrane which is selectively and preferentially permeable only to monovalent ions (such that ions other than monovalent ions hardly permeate the membrane) is used in the present invention. In accordance with selecting an ion exchange membrane which is selectively and preferentially permeable only to monovalent ions for the ion exchange membrane composing the prepositive electrodialysis cell, the concentration of ions other than the monovalent ions in the stream supplied to the electrolytic dialysis cell decreases. Accordingly, it becomes possible to decrease the concentration of cations other than the monovalent ions in the basic catholyte of the electrolytic dialysis cell, and to decrease the concentration of anions other than the monovalent ions in the acidic anolyte.

The concentration of salts of the monovalent ions in the diluted stream coming out from the prepositive electrodialysis cell is lower than the concentration in the waste water to be treated. However, the concentration of ions (other than the monovalent ions) relative to the concentration of the monovalent ions is higher than the concentration in the waste water to be treated. The diluted stream is supplied to the diluted stream compartment of the main electrodialysis cell at a first stage of the plural main electrodialysis cells which are combined in series to eliminate the ions to a final target concentration. If the ions to be eliminated for environmental requirements are only monovalent ions, a cation exchange membrane, an anion exchange membrane, or both of the membranes are selectively and preferentially used which only permeate monovalent ions. If all ions regardless of valency must be eliminated for environmental requirements, an ion exchange membrane is used which permeates all of the cations and anions effectively.

A membrane which permeates only the monovalent ions selectively and preferentially can also be used as the ion exchange membrane for decreasing the concentration of ions other than monovalent ions in the catholyte or anolyte of the electrolytic dialysis cell.

Treated waste water, in which the concentration of monovalent ions has been decreased, which is released from the central compartment of the electrolytic dialysis cell, can be mixed with waste water to be treated and can again be supplied to the prepositive electrodialysis cell, because the stream has a lower concentration of ions, except for the monovalent ions, than that of the waste water to be treated.

The concentrated stream in the main electrodialysis cell at the first step has a higher concentration of ions, except monovalent ions, compared to the concentration of monovalent ions than that of waste water to be treated depending on the situation. Therefore, it is not preferable to mix the concentrated stream with waste water to be treated and to supply it to the diluted stream compartment of the prepositive electrodialysis cell without any processing.

In the main electrodialysis cell, the quantity of ions transferred from the diluted stream compartment to the concentrated stream compartment is proportional to the quantity of electricity transmitted through a pair of ion exchange membranes and the number of membrane pairs. The quantity of electricity is mainly controlled by the specific electric conductance of the diluted stream under a given load voltage to the electrolytic cell. The specific electric conductance decreases approximately in proportion to the decrease in the concentration of salts in the diluted stream. On the other hand, a back diffusion phenomenon becomes noticeable when the concentration ratio of diluted stream to concentrated stream, that is the concentration gradient, increases. Specifically, the efficiency of the electric current decreases when the electric current density at the surface of the ion exchange membrane decreases.

In the first stage of the main electrodialysis cell for eliminating ions, the ratio of diluted stream concentration to concentrated stream concentration (concentration gradient) becomes very large when it is necessary to decrease significantly high ion concentrations to significantly low concentrations by a batch process wherein the treated stream in a diluted stream circulating tank is circulated between the tank and the electrodialysis cell until the ion concentration in the treated stream reaches a designated concentration. Moreover, a the specific electric conductivity of the diluted stream decreases remarkably in accordance with the decrease in ion concentration. In an industrial application of the electrodialysis cell, it is preferable to restrict the chargeable voltage to, for instance, approximately 50 volts for safety. Accordingly, when the specific electric conductivity decreases, the quantity of electric current (current density) also decreases.

According to the present invention, a process for the treatment of waste water that reduces the final ion concentration to a designated low value is achieved by providing a method wherein the ion concentration is not decreased by a batch process in a restricted stage of the electrodialysis cells, but by a process using all stages of a series of combined electrodialysis cells with a similar ratio at each of the stages.

Figure 1:
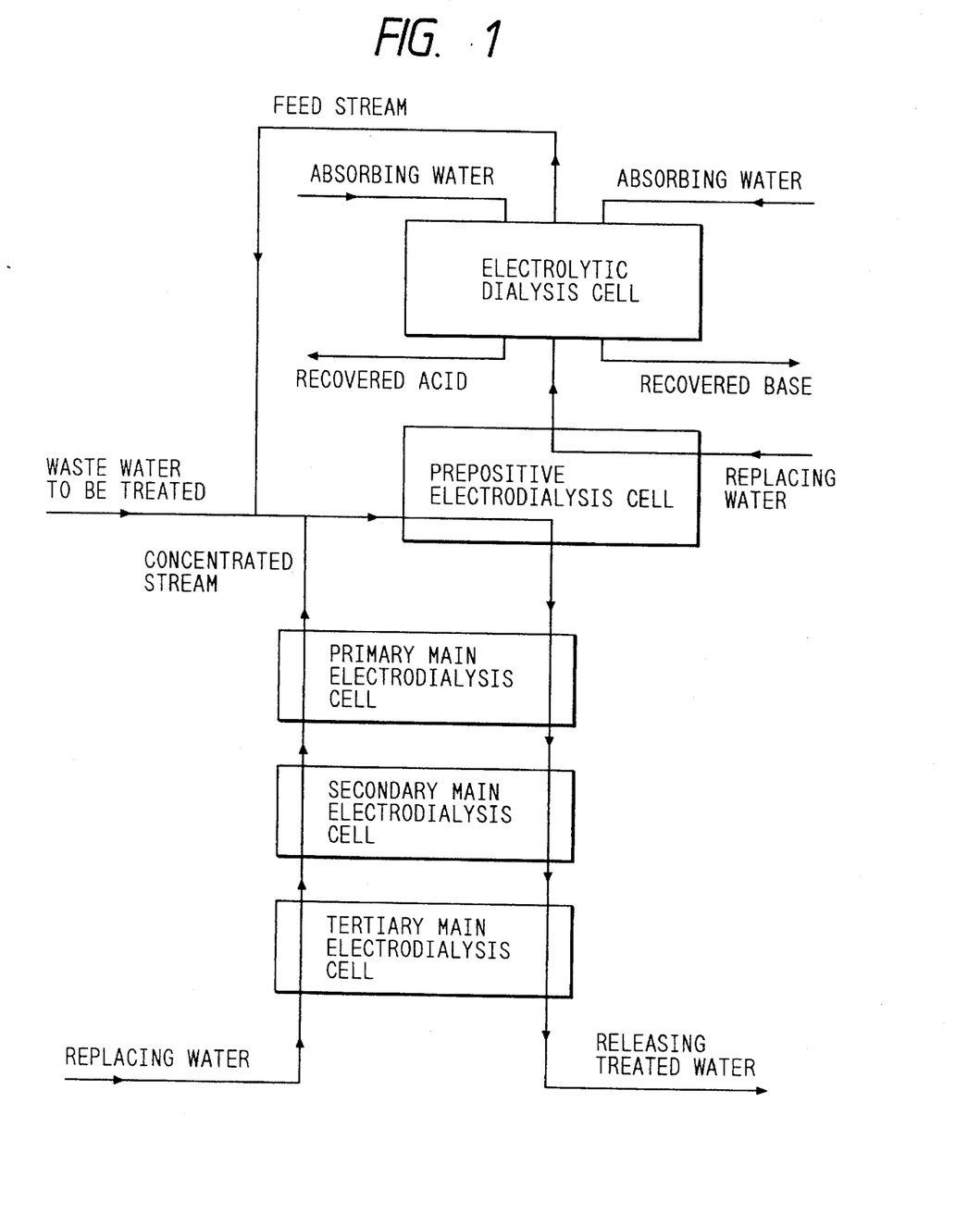
FIG. 1 is a flow chart indicating a preferred process of the present invention.

FIG. 1 is a flow chart showing a preferred embodiment of the present invention.

A typical feature in the composition of the present invention compared to the prior art, which only has electrodialysis cells, is that the composition of the present invention is provided with a recovery block comprising a combination of an electrolytic dialysis cell and half of a prepositive electrodialysis cell, and a treatment block comprising half of a prepositive electrodialysis cell and a succession of plural main electrodialysis cells combined in series (in 3 stages for instance).

The waste water to be treated is supplied to the prepositive electrodialysis cell provided at an interconnecting location between the recovery block and the treatment block. In the prepositive electrodialysis cell and each of the main electrodialysis cells combined in series to the prepositive electrodialysis cell, the concentration of salts preferably decreases at a constant ratio. For instance, when the final salt concentration in the waste water to be treated must be decreased by 1/256 by a combination of a prepositive electrodialysis cell and three main electrodialysis cells combined in series, reducing the salt concentration by ¼ at each of the stages achieves the objective. If the final salt concentration must be reduced by 1/1296, reducing the salt concentration by ⅙ at each of the stages achieves the objective. If the final concentration to be achieved is 1/4096, reducing the salt concentration by ⅛ at each stages is necessary. If the number of the main electrodialysis cells combined in series increases to four, reducing the salt concentration by 1/4.2 at each of the stages is sufficient to reduce the salt concentration in the waste water to be treated by 1/1296.

The relationship between the loading electric potential to the main electrodialysis cell and the current through the electrodialysis cell under a condition wherein the concentrated stream is commonly used as an anolyte and as a catholyte can be expressed by the following equation:

$$E_{cell} = NI(R_{ca}+R_{an}) + NIR_{di} + (N+I)IR_{co} \quad \text{(Eq. 1)}$$

where, $E_{cell}$: loading electric potential (Volts)
N: the number of ion exchange membrane pairs
I: electric current (Ampere)
$R_{ca}$: electric resistivity of cation exchange membrane (ohm)
$R_{an}$: electric resistivity of anion exchange membrane (ohm)
$R_{di}$: electric resistivity of diluted stream (ohm)
$R_{co}$: electric resistivity of concentrated stream (ohm)

If the loading electric potential over the electrodialysis cell is a constant value, the quantity of electricity available to the electrodialysis cell is significantly controlled by the electric resistivity of the diluted stream. As the specific electric resistivity of the diluted stream is approximately proportional to the salt concentration in the diluted stream, the quantity of electricity is approximately proportional to the salt concentration in the diluted stream.

Accordingly, a substantial part of the electric power consumed in the main electrodialysis cell generates heat in the diluted stream compartment, and it is necessary to cool and remove the heat from the circulating stream in the electrodialysis cell because the concentrated stream is also heated through the ion exchange membrane. The specific electric resistivity of the electrolyte aqueous solution decreases by about 3% per temperature elevation of 1° C., and the specific electric resistivity of the ion exchange membrane has the same characteristics. Therefore, effective operation of the electrodialysis cell can be achieved by properly controlling the temperature of the diluted stream.

The molar quantity of salts transferred from the diluted stream, which flows through the electrodialysis cell at a constant flow rate, to the concentrated stream is proportional to the salt concentration in the diluted stream at a constant potential. Accordingly, the number of necessary ion exchange membranes at each stage of the series of electrodialysis (the number of sets of diluted stream compartments and concentrated stream compartments) is approximately same even if the molar quantity of salt to be transferred varies significantly.

On the other hand, the concentrated stream in the main electrodialysis cells combined in series flows countercurrent to the diluted stream, and the concentrated stream accumulates salt which is transferred from the diluted stream. When the quantity of concentrated stream is less than the quantity of diluted stream by the same ratio as the concentration decreasing ratio of the diluted stream in the prepositive electrodialysis cell, the final concentration of the concentrated stream becomes approximately equal to the initial concentration in the waste water to be treated, and the concentrated stream is preferable for use in the process by recycling. In the above case, the ratio of salt concentration in the diluted stream and the concentrated stream in the main electrodialysis cell finally equals approximately the square of the decreasing rate of salt concentration in the diluted stream.

The concentrated stream contacting the anode in the prepositive electrodialysis cell and the main electrodialysis cell becomes acidic, and the concentrated stream contacting the cathode becomes basic. Therefore, in the conventional desalination of sea water, anolyte is kept acidic by adding acid in order to prevent the precipitation of magnesium hydroxide in the anolyte. In the present invention, the concentrated stream circulates commonly through all anode compartments and cathode compartments including the concentrated stream compartment of the prepositive electrodialysis cell and each of the main electrodialysis cells respectively. However, in order to prevent the catholyte from becoming too basic, the concentrated stream which becomes acidic in the anode compartment is supplied to the cathode compartment and is circulated.

The water used to replace the water supplied to the concentrated stream at the last stage of the series of main electrodialysis cells and the water supplied to the concentrated stream in the prepositive electrodialysis cell is preferably pure water in order to prevent contamination of the concentrated stream with impurities.

The ratio of salt concentration in waste water to be treated to salt concentration in the diluted stream in the prepositive electrodialysis cell is preferably equal to the ratio in the main electrodialysis cell. Therefore, the ratio of salt concentration in the concentrated stream to the salt concentration in the diluted stream equals to n(n−1) by making the ratio of the flow rate of the diluted stream to the flow rate of the concentrated stream equal to the ratio (n) of the salt concentration in the feed water to be treated to the salt concentration in the diluted stream, and the ratio of the salt concentration in the concentrated stream to the salt concentration in the feed water to be treated equals to (n−1).

The electrolytic dialysis cell comprises plural pairs of an anode compartment having an anion exchange membrane as a separating membrane, a cathode compartment having a cation exchange membrane as a separating membrane, and a central compartment having an anion exchange membrane and a cation exchange membrane as separating membranes, all of which are arranged alternatively. The concentrated stream from the prepositive electrodialysis cell is supplied to the central compartments as a common feed stream, and concurrently, an equal quantity of stream equal to the difference between the quantity of supplied stream and the quantity of stream permeating through the ion exchange membranes, flows out from the central compartments.

The acid is generated in the anolyte which circulates to the anode compartment, and the base is generated in the catholyte which circulates to the cathode compartment. The concentration of the acid and the base depends on the sum of the quantity of absorbing stream supplied to the anolyte and the catholyte and the quantity of stream permeating through the respective type of ion exchange membranes. According to the present invention, the acid and the base can be recovered relatively easily with a high concentration because salt concentration in the feeding stream to the electrolytic dialysis cell is several times as high as in the salt concentration in the waste water to be treated. However, an upper limit of salt concentration is generally restricted by chemical resistance to the acid or base of the respective ion exchange membrane. Although the acid and the base recovered by the present invention are both highly concentrated and highly pure, the acid and the base can be concentrated and purified easily by a conventional method if their usage requires.

The circulating stream in the central compartment of the electrolytic dialysis cell has preferably the same salt concentration as the salt concentration in the waste water to be treated because the excess circulating stream returns to the stream which is to be fed to the prepositive electrodialysis cell for re-treating.

The ion exchange membranes used in the present invention preferably have a selective transport number of at least 0.98 for either total cations or total anions. Further, the ion exchange membranes for selectively transporting monovalent ions in the present invention preferably have a selective transport number of at most 0.5 for ions other than the monovalent ions.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 2:
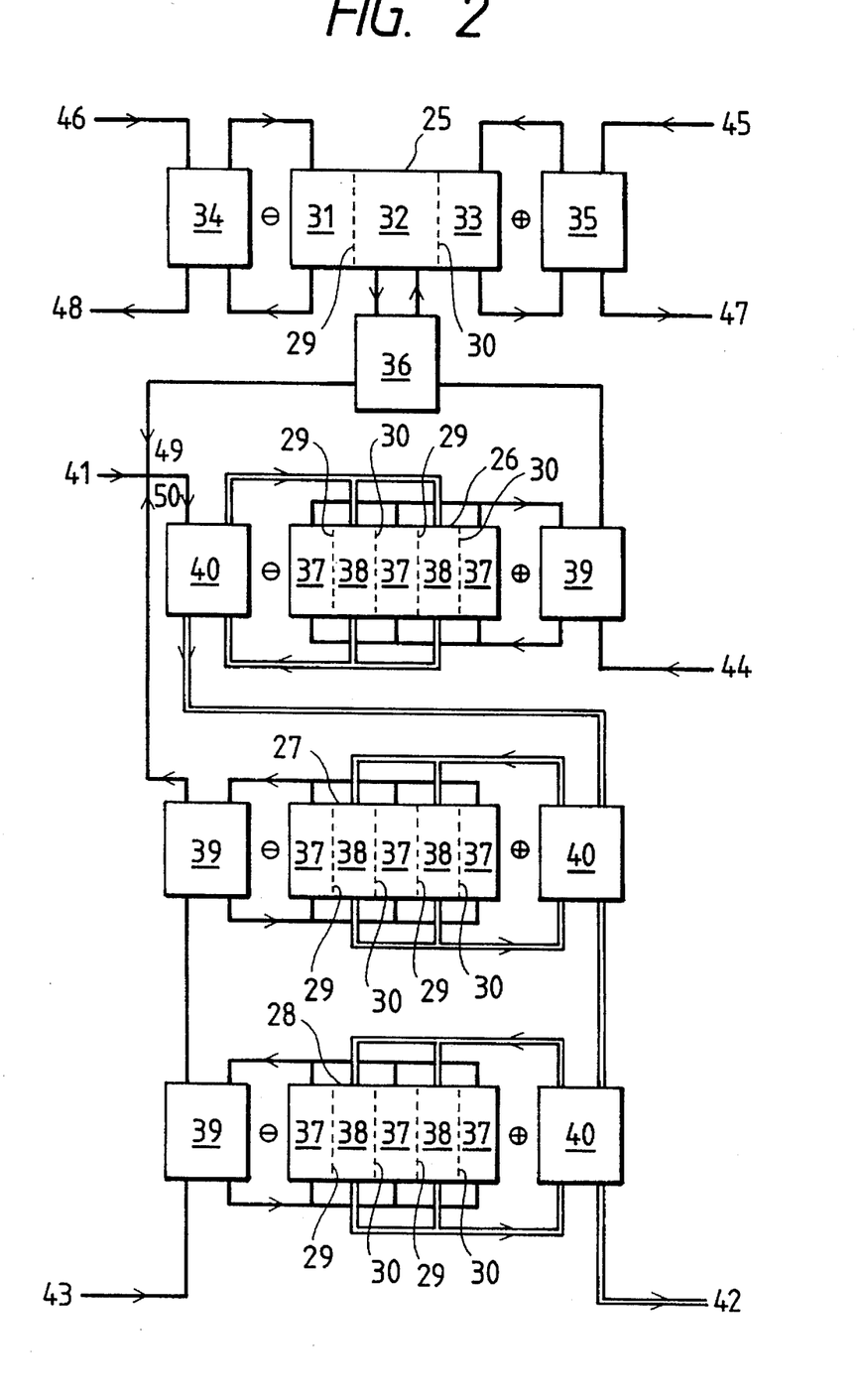
FIG. 2 is a schematic drawing indicating an apparatus for treating waste water containing neutral salts comprising monovalent ions according to the preferred embodiment shown in FIG. 1 of the present invention.

FIG. 1 is a flow chart showing the process for treating waste water containing neutral salts comprising monovalent ions according to a preferred embodiment of the present invention. FIG. 2 is a schematic drawing showing an apparatus for treating waste water according to FIG. 1.

In FIG. 2, 25 indicates an electrolytic dialysis cell, 26 is a prepositive electrodialysis cell, 27 is a main electrodialysis cell at the first stage of the main electrodialysis cells combined in series, 28 is the main electrodialysis cell at the last stage (the main electrodialysis cells at intermediate stages are omitted), 29 is a cation exchange membrane, 30 is an anion exchange membrane, 31 is a cathode compartment, 32 is a central compartment, 33 is an anode compartment, 34 is a catholyte circulating tank, 35 is an anolyte circulating tank, 36 is a feed stream circulating tank, 37 is a concentrated stream compartment, 38 is a diluted stream compartment, 39 is a concentrated stream circulating tank, 40 is a diluted stream circulating tank, 41 is a feed stream, 42 is a treated stream, 43 and 44 are displacement streams, 45 and 46 are absorbing streams, 47 is recovered acid, 48 is recovered base, 49 is a returning stream from the feed stream circulating tank of the electrolytic dialysis cell, and 50 is a returning stream from the concentrated stream circulating tank in the main electrodialysis cells combined in series.

The liquid in the process for treating waste water is transferred batchwise or continuously. That is, operation of the electrodialysis cell or the electrolytic dialysis cell can be repeated batchwise until the ion concentration in the diluted stream, the ion concentration in the concentrated stream, the recovered acid, or the recovered base reaches a designated level by supplying the feeding stream to the diluted stream circulating tank 40 of the electrodialysis cell, the waste water to be treated or the stream received from the previous stage of the feed stream circulating tank 36. However, in the above case, the concentrated stream 37 of the electrodialysis cell, or the stream entering into the cathode compartment 31 and the anode compartment 33 must have electric conductivity. Therefore, it is necessary to use an aqueous solution of salt, acid, or base with an adequate concentration except when the concentrated stream in the main electrodialysis cell is supplied, and to continuously vary the voltage in order to maintain an appropriate electric current during operation.

Otherwise, continuous operation with the same treating capacity as the above batch process is possible, wherein the feeding stream is accepted continuously from the waste water to be treated or the previous stage while keeping the concentration of the stream in the diluted compartment and the concentrated compartment of the respective main electrodialysis cells, or the concentration of the stream in the central compartment and the electrode compartments of the electrolytic dialysis cell, within a designated concentration at the exit. Additionally, the quantity of stream equal to a sum or a difference of the quantity of supplied stream and permeated stream through the ion exchange membranes is continuously taken out from the tank for the circulating stream and transferred to the processing step at the next stage. In the above case, the voltage must be controlled only to keep a constant value in order to keep the electric current constant during operation because the electric conductivity in the electrolytic dialysis cell is always constant. Accordingly, the above continuous operation for transferring the liquid continuously is preferable to the batch process.

The concentrated stream which is transferred through the main electrodialysis cells combined in series and the stream in the central compartment of the electrolytic dialysis cell are mixed with the waste water to be treated, and supplied to the prepositive electrodialysis cell. All of the above streams are released into the environment as treated waste water.

The acid and base are recovered with an adequate concentration depending on the quantity of absorbing streams. As the concentration of salt in the concentrated stream in the prepositive electrodialysis cell, which is the feed stream to the electrolytic dialysis cell, can be increased higher than the salt concentration in the waste water to be treated, it is easy to increase the concentration of the recovered acid and base.

Notwithstanding the above composition, the present embodiment can be combined with a method for recovering acid and base, wherein the electrolytic dialysis cell comprises two compartments, a cathode compartment and an anode compartment having an anion exchange membrane as a separating membrane, wherein acid is generated and recovered in the anode compartment and base is generated and recovered in the cathode compartment by supplying waste water containing neutral salts comprising monovalent ions to the cathode compartment and electrolyzing the neutral salt. In the above method, the composition of the electrolytic dialysis cell is simple, and the method is easily applicable to a case where the generating base is ammonium hydroxide which is easily separated and recovered from the stream in the cathode compartment containing neutral salts by a method such as distillation.

In a preferred embodiment, 6 m$^3$ of waste water containing 0.5 g-mol/liter ammonium nitrate was treated in a day, and the concentration of ammonium nitrate in the waste water released to the environment was decreased to at most 0.4 mg-mol/liter. The waste water to be treated contained 6 mg-mol/liter sulfate ions and 0.15 mg-mol/liter magnesium ions.

The prepositive electrodialysis cell 26 and each of the main electrodialysis cells combined in series 27, 28 had the capacity to decrease the concentration of ammonium nitrate by ⅙, respectively. The three main electrodialysis cells were combined in series and the transport of all the liquid was performed continuously. The quantity of replacing stream in the concentrated compartment of the prepositive electrodialysis cell 36 and the quantity of replacing stream in the concentrated stream compartment of the main electrodialysis cells combined in series were equal to the sum or the difference of the quantity of the stream supplied from outside and the stream permeated through the ion exchange membranes, the quantity of each was 1.5 m$^3$/day.

All of the electrodialysis cells 26, 27, 28 were composed of ion exchange membranes selectively permeable to monovalent cations and monovalent anions.

The quantity of ammonium nitrate to be processed and removed in a day was 4500 g-mol/day including the quantity of circulating treatment of feed stream in the central compartment of the electrolytic dialysis cell and the final concentrated stream in the electrodialysis cell. The prepositive electrodialysis cell 26 must perform electrodialysis of 3750 g-mol/day, which was equal to ⅚ of the total treating amount. Therefore, the necessary quantity of electricity was 5357 Faraday with a current efficiency of 70%, a filter press type stack of 20 pairs of ion exchange membranes, wherein each of the membranes had a surface area of 0.2 m$^2$ with a voltage of 37 V, was formed with 1 mm interval between each of the membranes, and the treatment was performed by loading 300 amperes electric current to the stack at 25° C. The concentration in the diluted stream was 83.3 mg mol/liter, and the concentration in the concentrated stream was 2.5 g-mol/liter. Therefore, the main electrodialysis cell 27 at the first stage must perform electrodialysis of 625 g-mol/day. Accordingly, the necessary quantity of electricity was 1250 Faraday with a current efficiency of 50%, a filter press type stack of 18 pairs of ion exchange membranes, wherein each of the membranes had a surface area of 0.2 m$^2$ with a voltage of 42 V, was formed with 1 mm intervals between each of the membranes, and the treatment was performed by loading 78 amperes electric current to the stack at 25° C. The concentration in the diluted stream was 13.9 mg mol/liter, and the concentration of the concentrated stream was 498 mg-mol/liter.

The main electrodialysis cell 27 at the second stage must perform electrodialysis of 104.2 g-mol/day. Accordingly, the necessary quantity of electricity was 261 Faraday with a current efficiency of 40%, a filter press type stack of 15 pairs of ion exchange membranes, wherein each of the membranes had a surface area of 0.2 m$^2$ with a voltage of 50 V, was formed with 1 mm intervals between each of the membranes, and the treatment was performed by loading 20 amperes electric current to the stack at 25° C. The concentration of the diluted stream was 2.3 mg mol/liter, and the concentration of the concentrated stream was 83.3 mg-mol/liter.

The main electrodialysis cell 28 at the third stage (final stage) must perform the electrodialysis of 17.3 g mol/day. Accordingly, the necessary quantity of electricity was 49 Faraday with a current efficiency of 35%, a filter press type stack of 11 pairs of ion exchange membranes, wherein each of the membranes had a surface area of 0.2 m$^2$ with voltage of 50 V, was formed with 1 mm intervals between each of the membranes, and the treatment was performed by loading 5 amperes electric current to the stack at 25° C. The concentration of the diluted stream was 0.4 mg-mol/liter, and the concentration of the concentrated stream was 13.9 mg-mol/liter.

The concentrated stream contacting the anode or the cathode is circulated from a common circulating tank for the concentrated stream. Hydrogen ion concentration (pH) in the aqueous solution of ammonium nitrate was 4.8 regardless of the concentration of the ammonium nitrate, and hydrogen ion concentration in the catholyte did not reach 12 which is the limit of hydrogen ion concentration for precipitating magnesium hydroxide.

The concentration of ammonium nitrate in the treated waste water was 0.4 mg-mol/liter, and the treated waste waster also contained a trace of sulfate ions and magnesium ions. On the other hand, the electrolytic dialysis cell 25 was supplied with 3750 g-mol/day of ammonium nitrate for dialyzing 3000 g-mol/day of ammonium nitrate to nitric acid and ammonium. Accordingly, the necessary quantity of electricity was 4286 Faraday with a current efficiency of 70%, a stack of 17 pairs of an ion exchange membranes having a surface area of 0.2 m$^2$ with a current density of 1500 A/m$^2$ and an electrode was formed with 10 mm intervals between each of the membranes and the electrode, and the treatment was performed by loading 300 amperes electric current by each cell voltage of 5.4 V to the stack at 25° C. The quantity of absorbing stream for nitric acid was 1 m$^3$/day and the concentration of the nitric acid was 3 g-mol/liter. The quantity of absorbing stream for ammonium hydroxide, which had a sulfate ion concentration of 0.3 g-mol/liter in order to give an electric conductivity equal to or more than the electroconductivity of the stream in the central compartment, was 1 m$^3$/day and the concentration of the ammonium hydroxide in the absorbing stream was 3 g-mol/liter. The concentration of the ammonium nitrate in the stream at the exit of the central compartment was 0.5 g-mol/liter.

The concentration of sulfate ion in the recovered nitric acid was at most 0.4 mg-mol/liter, and the mole ratio of the sulfate ion to the nitrate ion in the waste water to be treated was 1.2%. However, the mole ratio of the sulfate ion to the nitrate ion in the recovered nitric acid was 0.013%. Further, the quantity of magnesium in the stream supplied to the central compartment of the electrolytic dialysis cell 25 was reduced to 10% compared to the quantity of magnesium in the waste water to be treated.

According to the method of the present invention, 6 m$^3$ of the waste water containing 0.5 g-mol/liter ammonium nitrate was treated. As the result, the consumed electric power for the electrolytic dialysis and the electrodialysis was 1014 kWH, and the consumed electric power for removing 1 kg of ammonium nitrate and recovering ammonium hydroxide and nitric acid was 4.2 kWH. The electrolytic dialysis cell 25 for recovering the ammonium hydroxide and the nitric acid consumed 65.2% of the total consumed electric power, the prepositive electrodialysis cell 26 consumed 26.4%, and the three main electrodialysis cells combined in series, 27, 28 consumed 8.4%.

Figure 5:
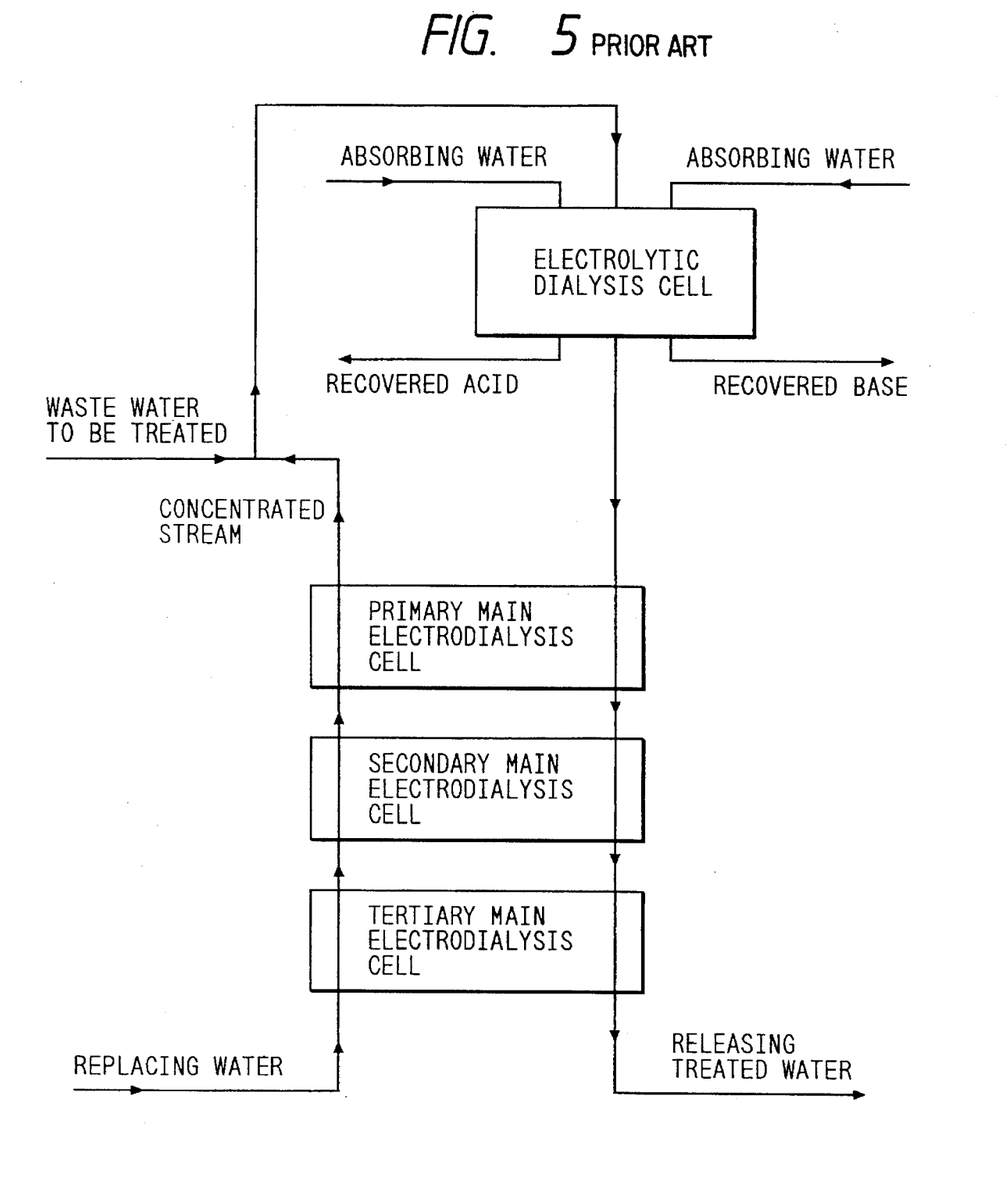
FIG. 5 is a flow chart explaining the treatment of waste water containing neutral salts comprising monovalent ions by a combination of conventional methods.

In order to confirm the advantage of the present invention, the present preferred embodiment was compared with conventional methods wherein the electrolytic dialysis cell and the electrodialysis cells are simply combined. FIG. 5 is a flow chart showing the treatment of waste water containing neutral salts comprising monovalent ions wherein the electrolytic dialysis cell and the electrodialysis cells are simply combined.

Referring to FIG. 5, a typical difference between the prior art shown in FIG. 4 and the present preferred embodiment shown in FIG. 2, is that the waste water to be treated (including returned stream from the concentrated stream in the electrodialysis cells) is supplied directly to the feed stream circulating tank in the central compartment of the electrolytic dialysis cell, the diluted stream having a reduced salt concentration is delivered from the central compartment of the electrolytic dialysis cell, and subsequently the diluted stream is transferred and treated through the circulating tanks for the diluted stream of the electrodialysis cells combined in series, and finally the diluted stream is released outside.

The same waste water as in the preferred embodiment shown in FIG. 2 was treated at 6 m$^3$/day to lower the concentration of ammonium nitrate in the waste water to be released to environment to equal or less than 0.4 mg-mol/liter.

All of the liquid transfers were performed continuously, because the concentration of ammonium nitrate was to be decreased by ⅙ at the electrolytic dialysis cell and each of the three main electrodialysis cells combined in series. In the present process, the replacing stream is supplied only to the concentrated stream compartment of the third electrodialysis cell, and the quantity of replacing stream was determined as 1.2 m$^3$/day so that the concentration of the ammonium nitrate in the concentrated stream finally became 0.5 g-mol/liter. As a result, the concentration of ammonium nitrate in the stream flowing through the treating process was 0.5 g mol/liter, and the quantity of the liquid was 7.2 m$^3$.

The electrolytic dialysis cell and all of the electrodialysis cells were composed of ion exchange membranes selectively permeable to monovalent cations and monovalent anions.

The quantity of ammonium nitrate to be processed and removed in a day was 3600 g-mol/day including the quantity of circulating treatment stream. The electrolytic dialysis cell performed electrolytic dialysis of 3000 g-mol/day, which was equal to ⅚ of the total treating amount, to generate nitric acid and ammonium hydroxide. Therefore, the necessary quantity of electricity was 4286 Faraday with a current efficiency of 70%. The treatment was performed with a stack of 17 pairs of an ion exchange membranes and an electrode, each of the ion exchange membranes had a surface area of 0.2 m$^2$ and a current density of 1500 A/m$^2$, and were formed with 10 mm intervals between each of the membranes and the electrode by loading 300 amperes electric current to each of cells at 25° C. The quantity of absorbing water for nitric acid was 1 m$^3$/day and the concentration of the nitric acid was 3 g-mol/liter. The quantity of absorbing water for ammonium hydroxide, which had a concentration of sulfate ions of 0.05 g-mol/liter in order to give an electric conductivity of equal to or more than the electric conductivity of the stream in the central compartment, was 1 m$^3$/day and the concentration of the ammonium hydroxide in the absorbing water was 3 g-mol/liter. The concentration of the ammonium nitrate in the stream at the exit of the central compartment was 0.5 g-mol/liter. The concentration of the ammonium nitrate in the stream at the exit of the central compartment was 83.3 mg mol/liter.

The main electrodialysis cell at the first stage in FIG. 5 must perform electrodialysis of 500 g-mol/day. Accordingly, the necessary quantity of electricity was 1000 Faraday with a current efficiency of 50%, a filter press type stack of 15 pairs of ion exchange membranes, wherein each of the membranes had a surface area of 0.2 m$^2$ with a voltage of 35 V, was formed with 1 mm intervals between each of the membranes, and the treatment was performed by loading 78 amperes electric current to the stack at 25° C. Concentration in the diluted stream was 13.9 mg mol/liter, and concentration in the concentrated stream was 498 mg-mol/liter.

The main electrodialysis cell at the second stage in FIG. 5 must perform electrodialysis of 83.4 g mol/day. Accordingly, the necessary quantity of electricity was 209 Faraday with a current efficiency of 40%, a filter press type stack of 12 pairs of ion exchange membranes, wherein each of the membranes had a surface area of 0.2 m$^2$ with a voltage of 40 V, was formed with 1 mm intervals between each of the membranes, and the treatment was performed by loading 20 amperes electric current to the stack at 25° C. The concentration in the diluted stream was 2.3 mg-mol/liter, and concentration in the concentrated stream was 83.3 mg-mol/liter.

The main electrodialysis cell at the third stage (final stage) in FIG. 5 must perform electrodialysis of 13.8 g-mol/day. Accordingly, the necessary quantity of electricity was 39 Faraday with a current efficiency of 35%, a filter press type stack of 9 pairs of ion exchange membranes, wherein each of the membranes had a surface area of 0.2 m$^2$ with a voltage of 39 V, was formed with 1 mm intervals between each of the membranes, and the treatment was performed by loading 5 amperes electric current to the stack at 25° C. The concentration in the diluted stream was 0.4 mg-mol/liter, and the concentration in the concentrated stream was 13.9 mg-mol/liter.

The concentration of the ammonium nitrate in the treated waste water was 0.4 mg-mol/liter. Although a trace of sulfate ion and magnesium ion were contained in the waste water, there was no substantial difference from the embodiment shown in FIG. 2.

On the contrary, the concentration of sulfate ion in the recovered nitric acid was 4.7 mg-mol/liter. The mole ratio of the sulfate ion to the nitrate ion in the waste water to be treated was 1.2%, while, the mole ratio of the sulfate ion to the nitrate ion in the recovered nitric acid was 0.16%, which was approximately 12 times the ratio of the preferred embodiment shown in FIG. 2. Further, the quantity of magnesium in the stream supplied to the central compartment of the electrolytic dialysis cell in FIG. 5 was approximately 2 times in the quantity in the preferred embodiment shown in FIG. 2.

According to the method of the comparative example shown in FIG. 5, 6 m³ of the waste water containing 0.5 g-mol/liter ammonium nitrate was treated. As the result, the consumed electric power for the electrolytic dialysis and the electrodialysis was 2357 kWH, and the consumed electric power for removing 1 kg of ammonium nitrate and recovering ammonium hydroxide and nitric acid was 9.8 kWH.

In the flow chart shown in FIG. 5, the reason large quantities of electricity are consumed, notwithstanding the fact that no prepositive electrodialysis cell is used compared to the preferred embodiment shown in FIG. 2, is that a high voltage is required because the concentration of ammonium nitrate in the stream in the central compartment of the electrolytic dialysis cell is low, and accordingly, the specific electric resistivity of the stream is high. The electrolytic dialysis cell for recovering nitric acid and ammonium hydroxide consumed 96% of the total electric power consumed, and the three main electrodialysis cells combined in series for removing ammonium nitrate from the waste water consumed only 4% of the total electric power consumed.

A combination of electrolytic dialysis and electrodialysis enables the concentration of neutral salt comprising monovalent ions contained in waste water to be lowered. According to the present invention, the concentration of sulfuric acid as an impurity in the recovered nitric acid can be reduced by 1/12, the concentration of magnesium as an impurity in the recovered base can be reduced by 1/2, and the possibility of causing failure of the operation of the electrolytic dialysis cell by precipitating magnesium hydroxide in the catholyte during the operation can be reduced.

Further, according to the present invention, the necessary electric power consumed especially for recovering acid and base can be reduced significantly compared to a simple combination of conventional methods. For instance, the power consumed per unit treating amount can be reduced by about 1/2. The above advantage is based on an effect which is realized by supplying the feed stream concentrated by the prepositive electrodialysis cell to the electrolytic dialysis cell. The above advantage can be obtained in a case recovering nitric acid and sodium hydroxide by electrodialysis of sodium nitrate as well.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method for treating waste water containing neutral salts containing monovalent ions, comprising the steps of supplying a feed stream to a prepositive electrodialysis cell;

separating the neutral salts from the waste water by electrodialysis in the prepositive electrodialysis cell to obtain a concentrated stream and a diluted stream;

supplying the concentrated stream from the prepositive cell to an electrolytic dialysis cell for separating the neutral salts into acids and bases; and supplying the diluted stream from the prepositive cell to at least two main electrodialysis cells, comprising a first stage and a final stage, combined in series for reducing the concentration of the neutral salts in the diluted stream.

2. The method as claimed in claim 1, comprising the steps of separating the diluted stream in the main electrodialysis cells to obtain a concentrated stream and a diluted stream, supplying the concentrated stream from the final stage of the main electrodialysis cells, countercurrent to the diluted stream, to concentrated stream compartments in the main electrodialysis cells combined in series, and merging the concentrated stream from the first stage of the main electrodialysis cells with the waste water to be treated which is supplied to the feed stream of the prepositive electrodialysis cell.

3. The method as claimed in claim 2, comprising the steps of circulating the diluted stream having a common constant concentration contained in the diluted stream compartments of the prepositive electrodialysis cell and the main electrodialysis cells and the concentrated stream having a common constant concentration contained in the concentrated stream compartments of the prepositive electrodialysis cell and the main electrodialysis cells at a constant flow rate, and continuously discharging an amount of treated waste water equal to the sum or the difference of the quantity of the feed stream continuously supplied and the quantity of the stream transferred through the ion exchange membrane.

4. The method as claimed in claim 3, comprising the step of circulating the concentrated stream in the prepositive electrodialysis cell and the main electrodialysis cells by passing through the anode compartment first and subsequently passing through the cathode compartment.

5. The method as claimed in claim 2, comprising the steps of supplying the diluted stream and the concentrated stream which are supplied batchwise to the diluted stream compartments and the concentrated stream compartments in the prepositive electrodialysis cell and the main electrodialysis cells, are circulated at a constant rate, and continuing the electrodialysis until the concentration in each of the streams reaches a designated value.

6. A method as claimed in claim 1, comprising the steps of supplying the waste water to be treated to a diluted stream compartment in the prepositive electrodialysis cell wherein the prepositive electrodialysis cell comprises the diluted stream compartment and a concentrated stream compartment which are separated by a cation exchange membrane and an anion exchange membrane, at least one of which is an ion exchange membrane which selectively transfers monovalent ions, and depleting the neutral salt in the diluted stream compartment and concentrating the neutral salt in the concentrated stream compartment by electrodialysis.

7. The method as claimed in claim 6, comprising the steps of circulating the diluted stream having a common constant concentration contained in the diluted stream compartments of the prepositive electrodialysis cell and the main electrodialysis cells and the concentrated stream having a common constant concentration contained in the concentrated stream compartments of the prepositive electrodialysis cell and the main electrodialysis cells at a constant flow rate, and continuously discharging an amount of treated waste water equal to the sum or the difference of the quantity of the feed stream continuously supplied and the quantity of the stream transferred through the ion exchange membrane.

8. The method as claimed in claim 7, comprising the step of
circulating the concentrated stream in the prepositive electrodialysis cell and the main electrodialysis cells by passing through the anode compartment first and subsequently passing through the cathode compartment.

9. The method as claimed in claim 6, comprising the steps of
supplying the diluted stream and the concentrated stream which are supplied batchwise to the diluted stream compartments and the concentrated stream compartments in the prepositive electrodialysis cell and the main electrodialysis cells, are circulated at a constant rate, and
continuing the electrodialysis until the concentration in each of the streams reaches a designated value.

10. The method as claimed in claim 1, comprising the steps of
supplying the waste water containing neutral salts comprising monovalent ions to a central compartment of the electrolytic dialysis cell, wherein the electrolytic dialysis cell comprises an anode compartment, the central compartment, and a cathode compartment, which are separated by an anion exchange membrane and a cation exchange membrane, at least one of which is an ion exchange membrane which selectively transfers monovalent ions,
recovering the acid and the base composing the neutral salt by electrolytic dialysis of the neutral salt into acids of monovalent anions and bases of monovalent cations, and
generating the acids in the anode compartment and the bases in the cathode compartment.

11. The method as claimed in claim 10, wherein the cation comprising the salt of the monovalent ion is ammonium ion, and comprising the step of
adding a strong electrolyte of acid or base to the cathode compartment to create an electric conductivity when ammonium hydroxide is generated in the cathode compartment for recovering ammonium hydroxide from the stream in the cathode compartment.

12. The method as claimed in claim 11, comprising the steps of
circulating the stream in the central compartments, the anode compartments, and the cathode compartments in the electrolytic dialysis cell, wherein each has a constant concentration, at a constant flow rate, and
continuously discharging an amount of treated waste water equal to the sum or the difference of the quantity of the feed stream continuously supplied and the quantity of the stream transferred through the ion exchange membrane.

13. The method as claimed in claim 11, comprising the steps of
circulating the diluted stream and the concentrated stream which are supplied batchwise to the central compartments, the anode compartments, and the cathode compartments in the electrolytic dialysis cell, at a constant rate, and
continuing the electrodialysis until the concentration in each of the streams reaches a designated value.

14. The method as claimed in claim 10, comprising the steps of
circulating the stream in the central compartments, the anode compartments, and the cathode compartments in the electrolytic dialysis cell, wherein each has a constant concentration, at a constant flow rate, and
continuously discharging an amount of treated waste water equal to the sum or the difference of the quantity of the feed stream continuously supplied and the quantity of the stream transferred through the ion exchange membrane.

15. The method as claimed in claim 10, comprising the steps of
circulating the diluted stream and the concentrated stream which are supplied batchwise to the central compartments, the anode compartments, and the cathode compartments in the electrolytic dialysis cell, at a constant rate, and
continuing the electrodialysis until the concentration in each of the streams reaches a designated value.

16. The method as claimed in claim 1, comprising the steps of
supplying the diluted stream in the prepositive electrodialysis cell or the main electrodialysis cells to a diluted stream compartment in the electrodialysis cell comprising the diluted stream compartment and a concentrated stream compartment, which are separated by a cation exchange membrane and an anion exchange membrane, at least one of which is an ion exchange membrane which selectively transfers monovalent ions, and
diluting the neutral salt in the diluted stream compartment and concentrating the neutral salt in the concentrated stream compartment by electrodialysis.

17. The method as claimed in claim 1, comprising the step of
merging the stream from the central compartment in the electrolytic dialysis cell with the waste water to be treated which is supplied to the feed stream of the prepositive electrodialysis cell.

18. The method as claimed in claim 1, comprising the step of
processing the concentrated stream from the final stage of the main electrodialysis cells combined in series to reduce the concentration of ions other than the monovalent ions to a value at least similar to the concentration in the waste water to be treated before merging with the waste water to be treated which is supplied to the feed stream of the prepositive electrodialysis cell.

19. The method as claimed in claim 1, comprising the steps of
decreasing the concentration of the neutral salt in the diluted stream in each stage of the main electrodialysis cells by an approximately constant rate, and
increasing the concentration of the neutral salt in the concentrated stream in each stage of the main electrodialysis cells increases by an approximately constant rate.

20. The method as claimed in claim 19, comprising the steps of
decreasing the concentration of the neutral salt in the diluted stream in each stage of the main electrodialysis cells by a factor in a range of from 4 to 8, and
increasing the concentration of the neutral salt in the concentrated stream in each stage of the main electrodialysis cells to a value in a range from 16 to 64 times the concentration of the neutral salt in the diluted stream.

* * * * *